(12) United States Patent
Hunt et al.

(10) Patent No.: US 11,950,002 B2
(45) Date of Patent: Apr. 2, 2024

(54) ANALOG RESOLUTION ADJUSTMENT FOR CMOS IMAGE SENSOR

(71) Applicant: Telefonaktiebolaget LM Ericsson (publ), Stockholm (SE)

(72) Inventors: Alexander Hunt, Tygelsjö (SE); Sven Karlsson, Malmö (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 96 days.

(21) Appl. No.: 16/860,248

(22) Filed: Apr. 28, 2020

(65) Prior Publication Data

US 2021/0337097 A1 Oct. 28, 2021

(51) Int. Cl.
*H04N 25/44* (2023.01)
*H04N 23/60* (2023.01)

(52) U.S. Cl.
CPC ............ *H04N 25/44* (2023.01); *H04N 23/60* (2023.01)

(58) Field of Classification Search
CPC ........ H04N 5/232; H04N 5/345; H04N 23/60; H04N 25/44; H04N 25/53; H04N 25/745
See application file for complete search history.

(56) References Cited

U.S. PATENT DOCUMENTS

| | | | |
|---|---|---|---|
| 6,972,791 B1 * | 12/2005 | Yomeyama | H04N 5/3765 348/304 |
| 7,283,167 B1 | 10/2007 | Schrey et al. | |
| 7,408,572 B2 * | 8/2008 | Baxter | H04N 5/374 348/208.14 |
| 8,624,992 B2 * | 1/2014 | Ota | H04N 5/37457 348/222.1 |
| 9,979,904 B2 | 5/2018 | Dominguez Castro et al. | |
| 2002/0100921 A1 | 8/2002 | Mabuchi et al. | |
| 2008/0226170 A1 | 9/2008 | Sonoda | |
| 2013/0308031 A1 | 11/2013 | Theuwissen | |
| 2015/0365610 A1 | 12/2015 | Domingues Castro et al. | |
| 2017/0142313 A1 * | 5/2017 | Gren | H04N 5/2353 |

FOREIGN PATENT DOCUMENTS

| | | |
|---|---|---|
| WO | 90/01844 A1 | 2/1990 |
| WO | 2014114740 A1 | 7/2014 |
| WO | 2019208412 A1 | 10/2019 |

* cited by examiner

*Primary Examiner* — Lin Ye
*Assistant Examiner* — Chriss S Yoder, III
(74) *Attorney, Agent, or Firm* — COATS & BENNETT, PLLC

(57) ABSTRACT

Analog power savings is achieved by pre-charging only those pixels of a sensor array that are needed as determined responsive to any one of a power configuration, image size, image position of interest, desired/selected frame rate, desired/selected resolution, etc. To that end, the solution presented herein selects one or more sensor segments, each comprising a subset of pixels of the sensor array, and only pre-charges the pixels in the selected segment(s). In so doing, the solution presented herein provides a power savings proportional to the number of uncharged pixel circuits.

19 Claims, 6 Drawing Sheets

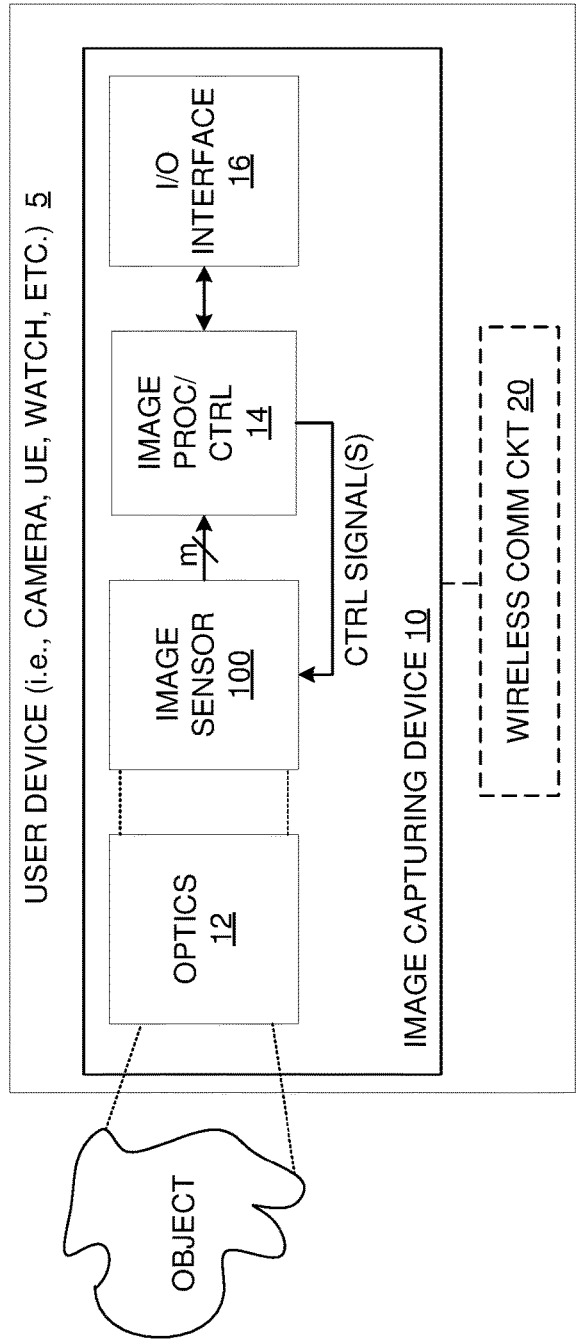
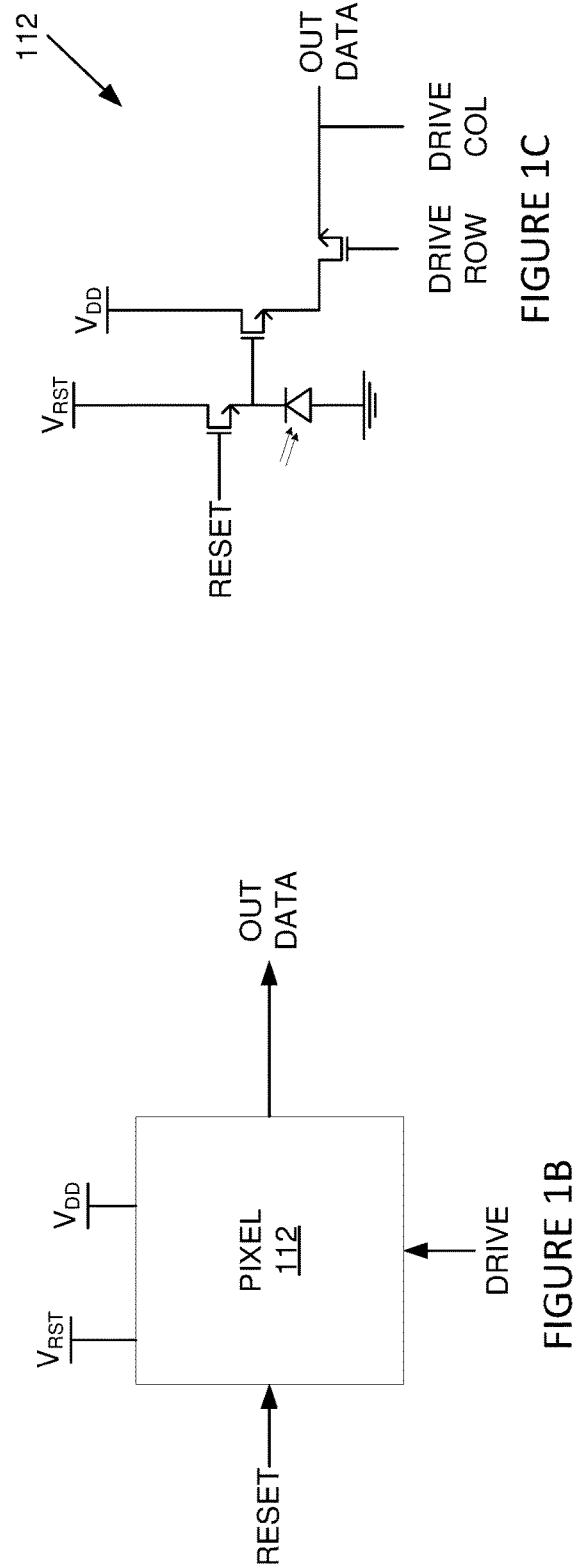

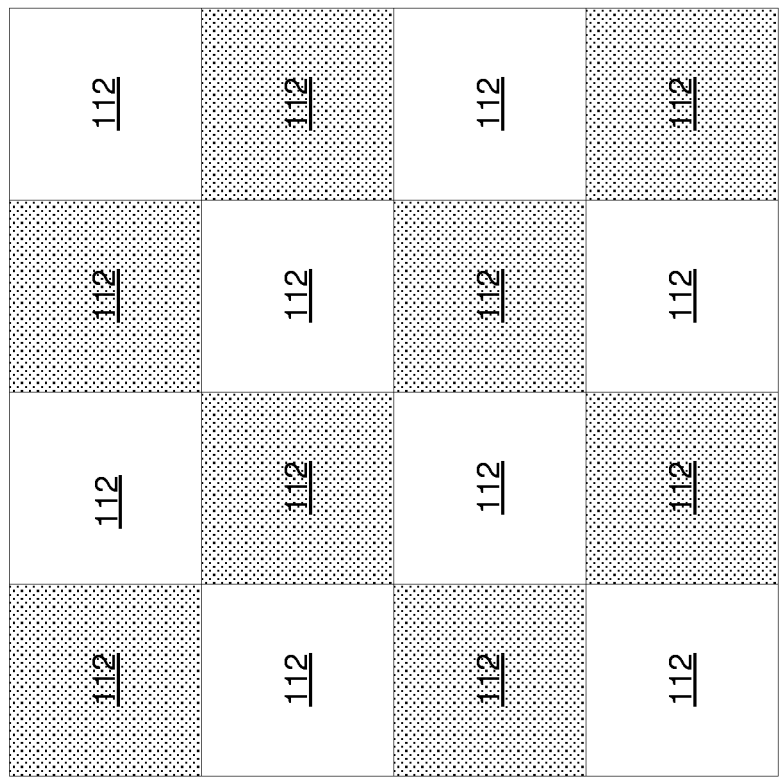
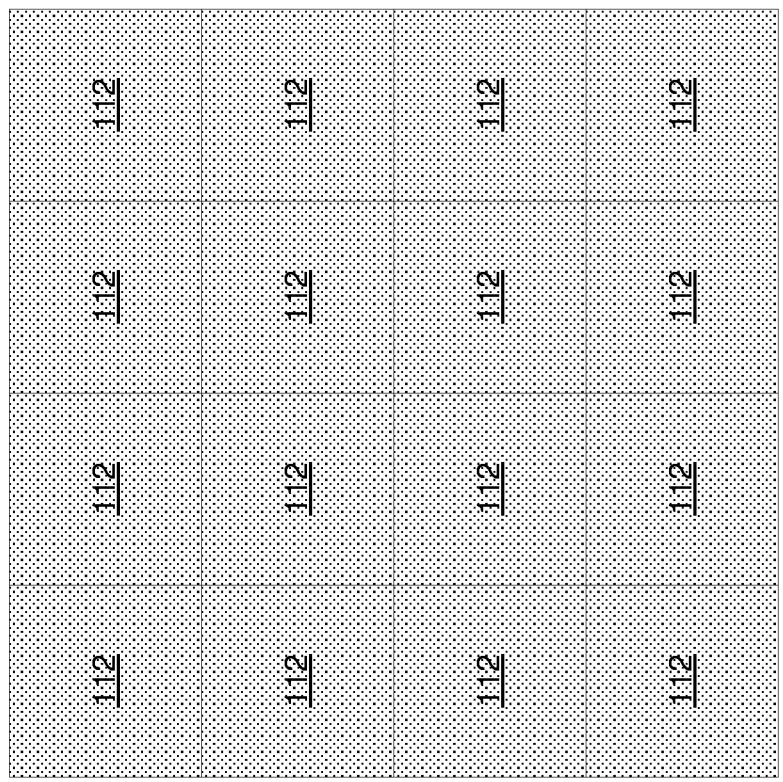
FIGURE 4

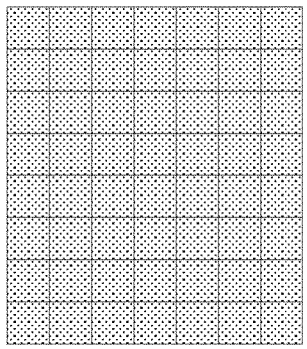
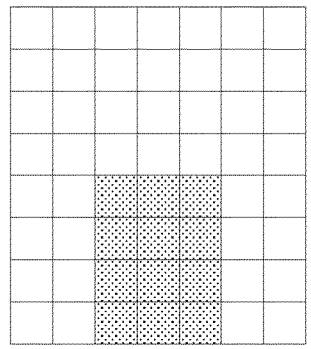
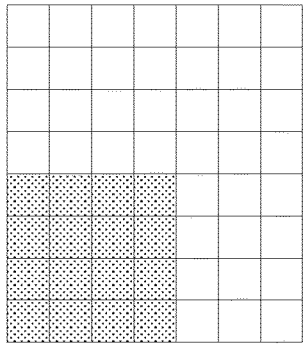
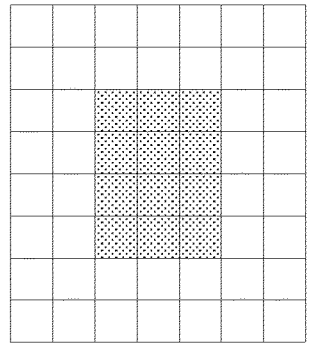
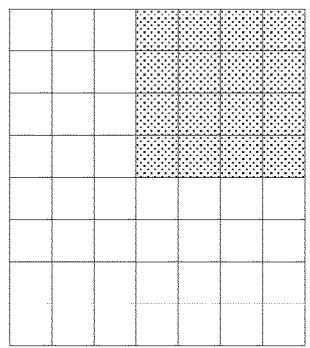
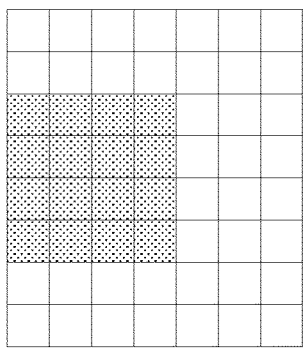
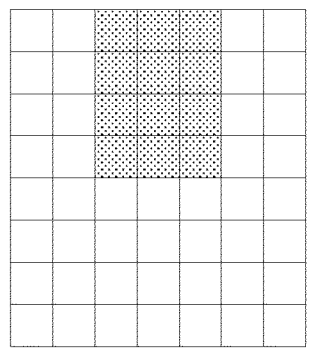
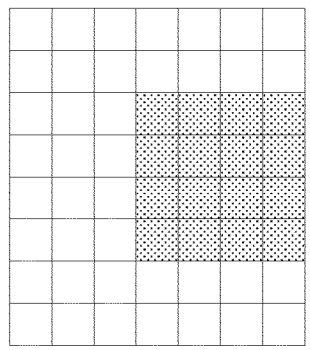
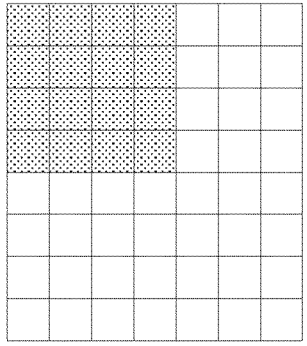
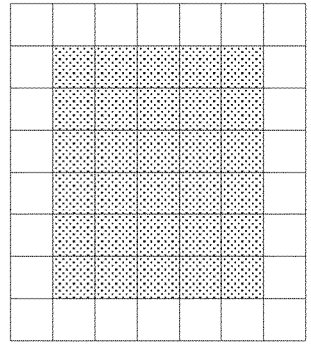
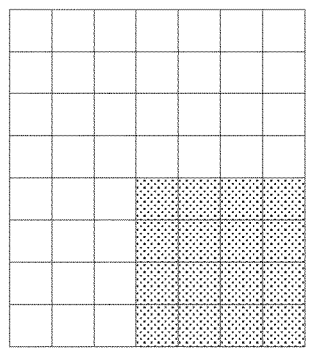
FIGURE 5

ANALOG RESOLUTION ADJUSTMENT FOR CMOS IMAGE SENSOR

BACKGROUND

Demand for high quality image capturing devices continues to increase along with the popularity of smartphones, tablets, etc. Most image capturing devices rely on battery power, and thus have access to a limited amount of power. As such, various techniques for reducing the power consumption of such image capturing devices have been developed.

In general, a captured image often includes information extraneous to the main focus of the image. One power reduction effort therefore focuses on reducing the amount of detected light that is transferred to a digital processor, e.g., by eliminating and/or reducing the transfer of the extraneous detected light. For example, host windowing may be used, where light captured by a subset of the pixels is transferred to the processor. Windowing may also be used in digital zoom applications, where light detected from a smaller portion of the sensor array is output and shown on the screen, which gives the impression of zooming. In another example, pixel skipping may be used, where light detected by some alternating number of pixels, e.g., every other pixel or every third pixel, is transferred to the processor. Such host windowing and/or pixel skipping reduces the amount of data output by the sensor, and thus reduces the amount of data needing to be processed. In so doing, host windowing and/or pixel skipping reduces the power consumption of the image capturing device.

To date, all power reduction techniques reduce power in the digital domain. One reason for this is that the digital operations of an image capturing device typically consumes more of the power budget than the analog operations, e.g., 55% of the power budget for a CMOS (Complementary Metal Oxide Semiconductor) image sensor (CIS) is typically reserved for the digital domain. Thus, efforts have been focused on reducing power of this larger power consuming aspect. Further, because relatively simply code changes may often be used to manipulate digital domain operations, e.g., by controlling how and/or when digital processing occurs and/or what is digitally processed, controlling power consumption for the digital domain is generally simpler than controlling power consumption for the analog domain. However, current digital domain power savings techniques can only reduce the total power consumption by so much, e.g., by a maximum approaching the total power budget allocated to the digital domain. As such, there remains a need for additional power savings solutions for image capturing devices.

SUMMARY

The solution presented herein provides selectable power conservation in the analog domain by controlling which pixel circuit in a sensor array are pre-charged, and which remain uncharged. In so doing, the solution presented herein provides a power savings proportional to the number of uncharged pixel circuits.

One exemplary embodiment comprises an image sensor comprising a plurality of pixel circuits. The image sensor comprises two or more sensor segments, a charge control circuit, and a drive control circuit. Each of the two or more sensor segments comprise a different set of one or more of the plurality of pixel circuits. The charge control circuit is configured to pre-charge each of the one or more of the plurality of pixel circuits in a selected one of the two or more sensor segments. The drive control circuit is configured to drive at least one of the one or more pre-charged pixel circuits to output light data sensed by the corresponding pre-charged pixel circuit to an image processor operatively connected to the image sensor.

In one exemplary embodiment, the charge control circuit is further configured to select one of the two or more sensor segments for pre-charging responsive to an input control signal specifying at least one of a power configuration, a frame rate, a selected resolution, and a region of interest.

In one exemplary embodiment, the charge control circuit is further configured to select one of the two or more sensor segments for pre-charging responsive to an input control signal specifying the selected one of the two or more sensor segments.

In one exemplary embodiment, the charge control circuit is further configured to define the two or more sensor segments responsive to an input control signal specifying at least one of a power configuration, a frame rate, a selected resolution, and a region of interest.

In one exemplary embodiment, the charge control circuit may be configured to define the two or more sensor segments by applying a best fit model identifying which of the one or more pixel circuits best satisfy requirements specified by the at least one of the power configuration, the frame rate, the selected resolution, and the region of interest.

In one exemplary embodiment, the charge control circuit is further configured to define the two or more sensor segments responsive to an input control signal specifying the one or more pixel circuits for each of the two or more sensor segments.

In one exemplary embodiment, the two or more sensor segments comprise a first sensor segment comprising all of the plurality of pixel circuits and a second sensor segment comprising less than all of the plurality of pixel circuits.

In one exemplary embodiment, the second sensor segment may comprise alternating ones of the plurality of pixel circuits. In another example, the second sensor segment comprises every $n^{th}$ one of the plurality of pixel circuits, e.g., where n equals 3 or 5 or 10. In another example, the second sensor segment may comprise every $n^{th}$ subgroup of pixel circuits, where each subgroup includes color-specific ones of the plurality of pixel circuits arranged according to a color-filter pattern, e.g., a Bayer filter pattern.

In one exemplary embodiment, each of the two or more sensor segments comprise one or more pixel circuits associated with a different region of the image sensor.

In one exemplary embodiment, the two or more sensor segments may comprise at least two of a first sensor segment comprising one or more pixel circuits in a upper left region of the image sensor, a second sensor segment comprising one or more pixel circuits in a lower left region of the image sensor, a third sensor segment comprising one or more pixel circuits in a upper right region of the image sensor, a fourth sensor segment comprising one or more pixel circuits in a lower right region of the image sensor, a fifth sensor segment comprising one or more pixel circuits in an upper center region of the image sensor, a sixth sensor segment comprising one or more pixel circuits in an lower center region of the image sensor, and a seventh sensor segment comprising one or more pixel circuits in a central region of the image sensor, where at least two of these sensor segments may partially overlap.

In one exemplary embodiment, the charge control circuit is further configured to pre-charge each of the one or more pixel circuits in a selected plurality of the two or more sensor segments.

In one exemplary embodiment, the charge control circuit is configured to select one of the two or more sensor segments responsive to an image size of interest and/or an image position of interest.

In one exemplary embodiment, at least some of the two or more sensor segments comprise different numbers of pixel circuits.

In one exemplary embodiment, the number of sensor segments is less than or equal to the number of the plurality of pixel circuits.

In one exemplary embodiment, a different reset control line connects the charge control circuit to each of the two or more sensor segments, and wherein each of the one or more pixel circuits in a corresponding one of the two or more sensor segments connects to the charge control circuit via a common reset control line.

In one exemplary embodiment, the charge control circuit controls a switching network configured to connect the charge control circuit to the one or more pixel circuits of the selected one of the two or more sensor segments to pre-charge the corresponding one or more pixel circuits.

In one exemplary embodiment, the charge control circuit controls a system of gates with two or more inputs configured to selectively connect the charge control circuit to the one more pixel circuits of the selected one of the two or more sensor segments to pre-charge the corresponding one or more pixel circuits.

One exemplary embodiment comprises a user device comprising an image sensor comprising two or more sensor segments, a charge control circuit, and a drive control circuit. Each of the two or more sensor segments comprises a different set of one or more of the plurality of pixel circuits. The charge control circuit is configured to pre-charge each of the one or more of the plurality of pixel circuits in a selected one of the two or more sensor segments. The drive control circuit is configured to drive at least one of the one or more pre-charged pixel circuits to output light data sensed by the corresponding pre-charged pixel circuit to an image processor operatively connected to the image sensor.

In one exemplary embodiment, the user device comprises a wireless communication device further comprising wireless communication circuitry.

In one exemplary embodiment, the user device comprises a digital camera.

One exemplary embodiment comprises method of pre-charging one or more pixel circuits of an image sensor comprising a plurality of pixel circuits and two or more sensor segments. Each of the two or more sensor segments comprises a different set of one or more of the plurality of pixel circuits. The method comprises selecting one of the two or more sensor segments for pre-charging, and pre-charging each of the one or more of the plurality of pixel circuits in the selected sensor segment. The method further comprises driving at least one of the one or more pre-charged pixel circuits to output light data sensed by the corresponding pre-charged pixel circuit to an image processor operatively connected to the image sensor.

In one exemplary embodiment, the selecting the one of the two or more sensor segments for pre-charging comprises selecting the one of the two or more sensor segments for pre-charging responsive to an input control signal specifying at least one of a power configuration, a frame rate, a selected resolution, and a region of interest.

In one exemplary embodiment, the selecting the one of the two or more sensor segments for pre-charging comprises selecting one of the two or more sensor segments for pre-charging responsive to an input control signal specifying the one of the two or more sensor segments.

In one exemplary embodiment, the method further comprises defining the two or more sensor segments responsive to an input control signal specifying at least one of a power configuration, a frame rate, a selected resolution, and a region of interest.

In one exemplary embodiment, the method further comprises defining the two or more sensor segments by applying a best fit model identifying which of the one or more pixel circuits best satisfy requirements specified by the at least one of the power configuration, the frame rate, the selected resolution, and the region of interest.

In one exemplary embodiment, the method further comprises defining the two or more sensor segments responsive to an input control signal specifying the one or more pixel circuits for each of the two or more sensor segments.

In one exemplary embodiment, the selecting comprises selecting a first sensor segment comprising all of the plurality of pixel circuits or selecting a second sensor segment comprising less than all of the plurality of pixel circuits.

In one exemplary embodiment, the selecting comprises selecting the second sensor segment comprising every $n^{th}$ one of the plurality of pixel circuits.

In one exemplary embodiment, each of the two or more sensor segments comprise one or more pixel circuits associated with a different region of the image sensor.

In one exemplary embodiment, the selecting comprises selecting one of a first sensor segment comprising one or more pixel circuits in a upper left region of the image sensor, a second sensor segment comprising one or more pixel circuits in a lower left region of the image sensor, a third sensor segment comprising one or more pixel circuits in a upper right region of the image sensor, a fourth sensor segment comprising one or more pixel circuits in a lower right region of the image sensor, a fifth sensor segment comprising one or more pixel circuits in an upper center region of the image sensor, a sixth sensor segment comprising one or more pixel circuits in an lower center region of the image sensor, or a seventh sensor segment comprising one or more pixel circuits in a central region of the image sensor, wherein at least two of these sensor segments may partially overlap.

In one exemplary embodiment, the selecting further comprises selecting a plurality of the two or more sensor segments, each of the selected plurality of the two or more sensor segments being associated with a different region of the image sensor, and wherein the pre-charging comprises pre-charging each of the one or more of the plurality of pixel circuits in the selected plurality of sensor segments.

In one exemplary embodiment, the selecting comprises selecting one of the two or more sensor segments responsive to an image size of interest and/or an image position of interest.

BRIEF DESCRIPTION OF THE DRAWINGS

FIG. 1A shows a block diagram of a user device according to exemplary embodiments of the solution presented herein.

FIG. 1B shows a block diagram of a pixel applicable to exemplary embodiments of the solution presented herein.

FIG. 1C shows a circuit diagram of a pixel applicable to exemplary embodiments of the solution presented herein.

FIG. 4 shows sensor segments for a sensor array according to exemplary embodiments of the solution presented herein.

FIG. 5 shows alternative sensor segments for a sensor array according to exemplary embodiments of the solution presented herein.

DETAILED DESCRIPTION

Figure 2:
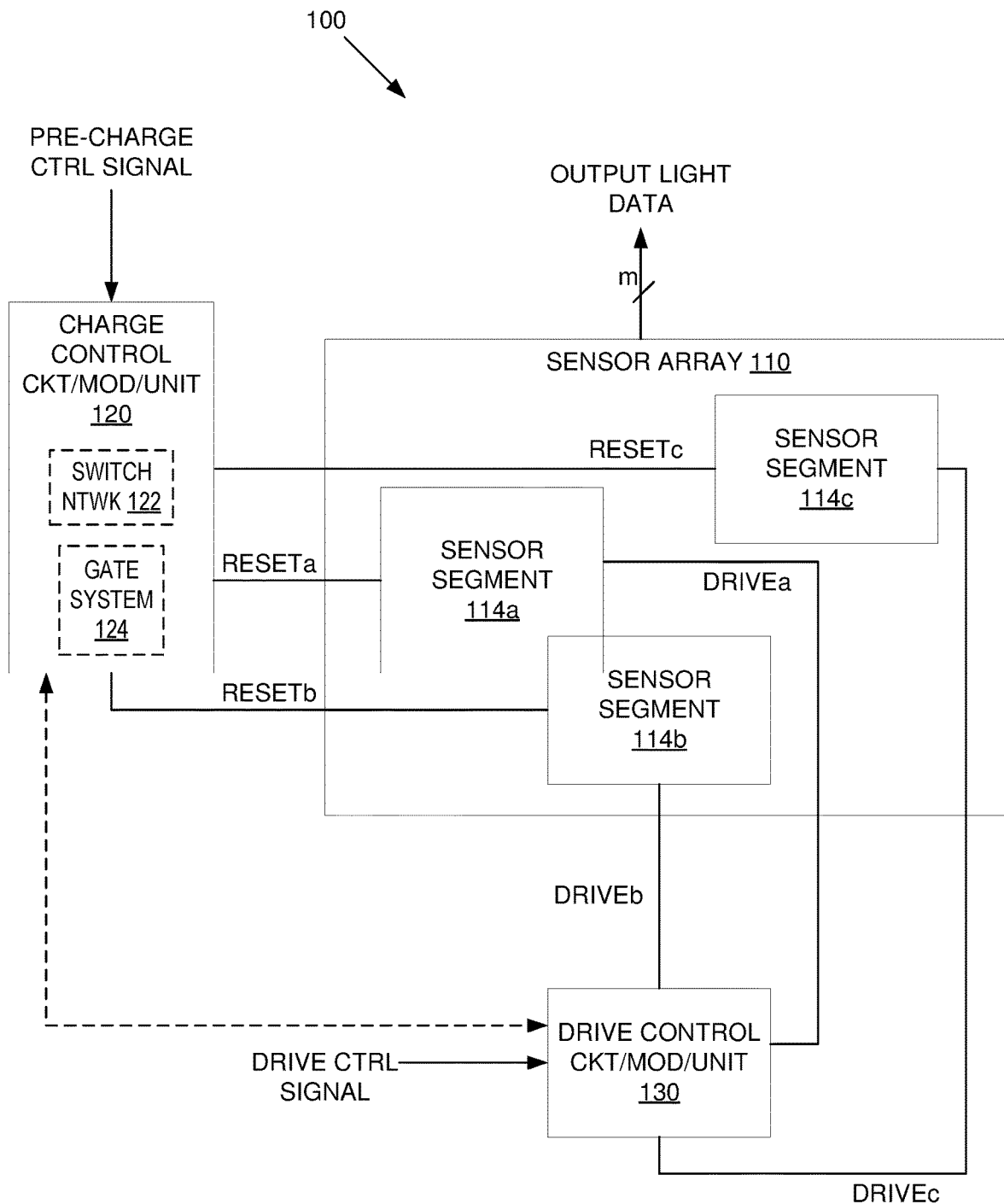
FIG. 2 shows a block diagram of an image sensor according to exemplary embodiments of the solution presented herein.

FIG. 1A shows an exemplary user device 5 comprising an image capturing device 10 that captures still and/or video images. Exemplary user devices 5 include, but are not limited to, cameras (including digital cameras that capture still images, e.g., a Digital Still Camera (DSC) and/or video, e.g., a Digital Video Camera (DVC)), watches, and personal communication devices (e.g., tablets, cellular telephones, personal digital assistants, etc.). For simplicity, the user device 5 of FIG. 1A only shows the components pertinent for the image capturing device 10. It will be appreciated, however, that while not shown, user device 5 may also include additional components and/or electronics necessary for the general operation of the user device 5, e.g., wireless communication circuitry 20 for a wireless communication user device 5.

Image capturing device 10 comprises optics 12, an image sensor 100, an image processor/controller 14, and an input/output (I/O) interface 16. The optics 12 capture light from an object external to the user device 5 and direct/focus the captured light onto the image sensor 100. The image sensor 100 comprises a plurality of pixels 112 that detect the focused light, and output the detected light to the image processor/controller 14. The image processor/controller 14 processes the detected light to generate an image of the object, also referred to herein as image data and/or detected image data. The image processor/controller 14 outputs the generated image, via I/O interface 16, to the user (e.g., via a display), a host device (not shown) for further processing, and/or a storage device.

The image sensor 100 comprises an array of M pixels 112, e.g., an $M_1 \times M_2$ matrix, where $M = M_1 \cdot M_2$ where the total number of pixels 112 (M) defines the maximum resolution of the image sensor 100, and thus of the image capturing device 10. It will be appreciated that each pixel 112 is an electronic circuit, and thus pixels 112 may also be referred to herein as pixel circuits 112. FIG. 1B shows an exemplary pixel 112. As understood by those skilled in the art, a pixel 112 must be pre-charged before it can detect light. Once pre-charged, the pixel 112 detects any input light. The detected light is output when the pixel 112 is driven. Thus, each pixel 112 of the image sensor 100 is controlled by a RESET signal, which selectively connects the pixel 112 to $V_{RST}$ to pre-charge the pixel to enable the pixel to capture light, and a separate DRIVE signal, which selectively connects the pixel 112 to $V_{DD}$ to drive the pre-charged pixel 112 to enable the pixel 112 to output the detected light.

FIG. 1C shows a more detailed example of an exemplary pixel 112 comprising multiple transistors and a diode. It will be appreciated that implementations other than the one shown in FIG. 1C may be used for the pixel 112 of FIG. 1B. Exemplary pixels include, but are not limited to, Front Side Illuminated (FSI) pixels and Backs Side Illuminated (BSI) pixels. It will be appreciated that the structure of BSI pixels enables wiring to be added without impacting the aperture ration of the pixel, and thus enables implementation of the solution presented herein without reducing the aperture ratio of the pixel.

The image sensor 100 and image processor/controller 14 are the main contributors to the power budget of the image capturing device 10, where image sensor 100 defines the analog portion of the power budget and image processor/controller 14 defines the digital portion of the power budget. Conventionally, power consumption is reduced by controlling which pixels 112 are driven and which pixels 112 are not driven, e.g., by using windowing or pixel skipping. Such windowing and pixel skipping techniques, however, only work in the digital domain.

The solution presented herein provides control of the analog domain power consumption by controlling how many and which pixels 112 are pre-charged. As such, the solution presented herein reduces the power consumption of the sensor array 110 by an amount proportional to the uncharged pixels 112. For example, if only half of the pixels 112 are pre-charged, the analog power consumption is reduced by approximately 50%. It will be appreciated that the solution presented herein may be used in conjunction with digital power control techniques to further control the total power consumption of the image capturing device 10. It will further be appreciated that for the solution presented herein, only those pixels that are pre-charged are driven. As such, in some embodiments, the pre-charging and driving aspects of the pixels 112 may be coordinated, e.g., by the image processor/controller 14 and/or by any charge control/drive circuits.

Figure 3:
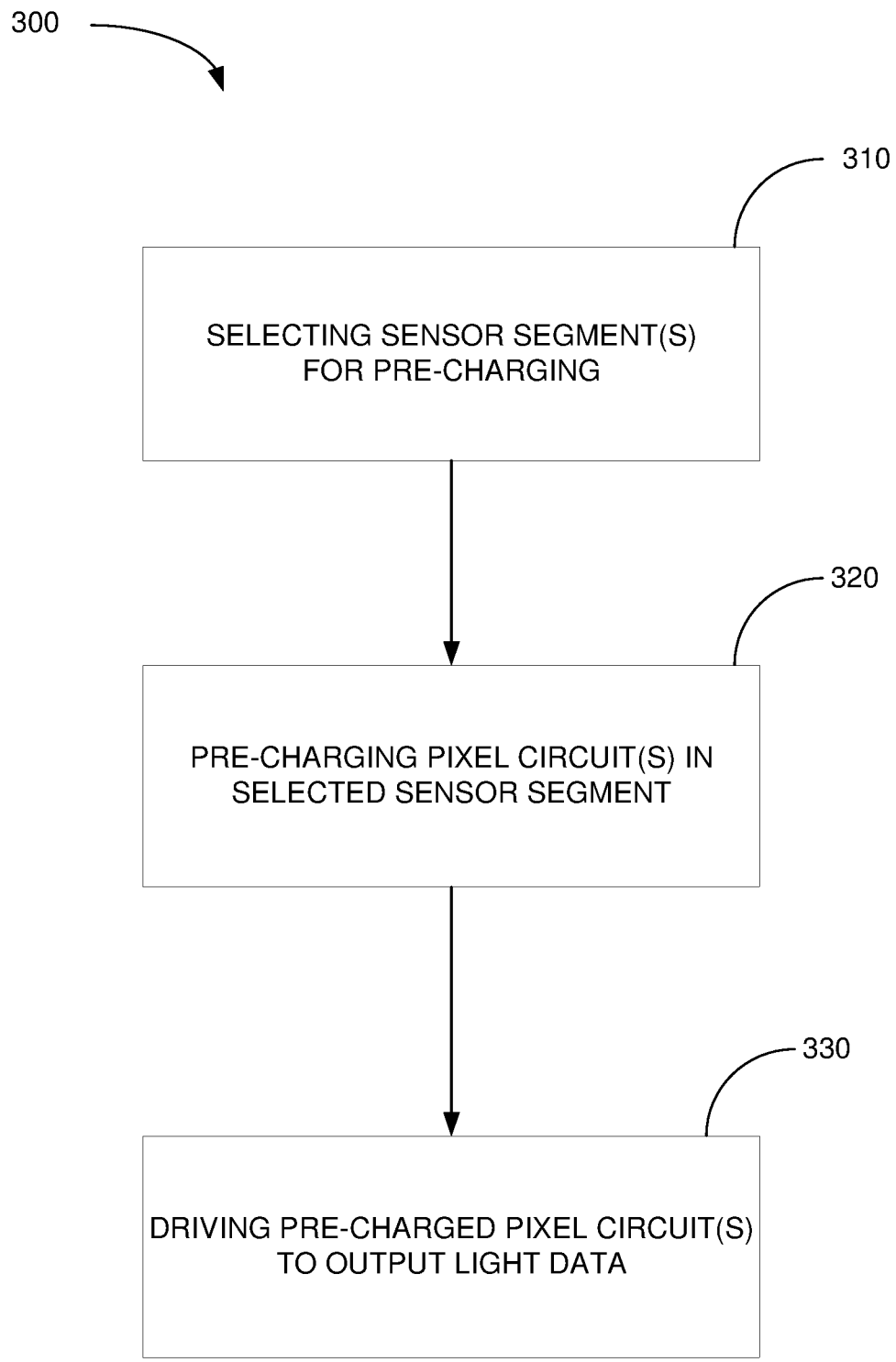
FIG. 3 shows power reduction method according to exemplary embodiments of the solution presented herein.

FIG. 2 shows a block diagram of an exemplary image sensor 100, while FIG. 3 shows an exemplary method 300 for controlling the image sensor 100. Image sensor 100 comprises a sensor array 110 comprising a plurality of pixels 112, a charge control circuit 120, and a drive control circuit 130. The sensor array 110 comprises two or more sensor segments 114, where each of the two or more sensor segments 114 comprises a different set of pixel(s) 112. While sensor array 110 is shown as a two-dimensional matrix of pixels 112, it will be appreciated that the sensor array 110 may alternatively comprise a vector of pixels 112, where the vector of pixels 112 comprises two or more sensor segments 114. The charge control circuit 120 is configured to pre-charge pixels 112 via RESET control lines, while the drive control circuit 130 is configured to drive pre-charged pixels 112 via DRIVE control lines. While FIG. 2 shows separate RESET and DRIVE control lines for each of three sensor segments 114a-c, it will be appreciated that each segment-specific RESET and/or DRIVE control line may represent individual RESET and DRIVE control lines for each pixel 112 in the corresponding segment 114, or may represent a common RESET and/or DRIVE control line specific to the corresponding segment 114, as discussed further below. Further, it will be appreciated that the solution presented herein does not require three sensor segments 114a-c as shown in FIG. 2; sensor array 110 may comprise fewer or additional sensor segments 114 than those shown.

The power control method 300 of the solution presented herein comprises selecting one of the sensor segments 114 for pre-charging (block 310), and pre-charging each of the pixel(s) 112 in the selected sensor segment 114 (block 320), e.g., by controlling the RESET signal applied to the pixels 112 in the selected segment 114. The method 300 further comprises driving at least one of the pre-charged pixel(s)

112 to output the light data sensed by the corresponding pre-charged pixel 112 to an image processor/controller 14 operatively connected to the image sensor 100 (block 330). By pre-charging only those pixel(s) 112 in the selected sensor segment 114, the solution presented herein reduces the power typically consumed during the pre-charging function of the sensor array 110, and thus reduces the total power consumed by the image sensor 100.

As noted above, the solution presented herein pre-charges only those pixel(s) 112 that are part of a selected sensor segment 114. According to the solution presented herein, the sensor array 110 may be divided into any number of sensor segments 114, where each sensor segment 114 may comprise any number of the pixels 112 in the sensor array 110 less than or equal to the total number of pixels 112 in the array 110. In some embodiments, different sensor segments 114 may each have the same number of pixels 112. In other embodiments, some or all of the sensor segments 114 may have a different number of pixels 112. In some embodiments, each sensor segment 114 may comprise only pixels 112 not in any other sensor segment 114. In other embodiments, while each sensor segment 114 comprises a different set of pixels 112, one or more pixels 112 in one sensor segment 114 may also be part of another sensor segment 114.

It will be appreciated that each sensor segment 114 may be predefined for a particular image sensor 100. For example, sensor segments 114 may be predefined for particular power modes, resolutions, frame rates, etc. Alternatively, the image processor/controller 14 may selectively define one or more sensor segments 114 responsive to user input and/or required resolution and/or light data, etc. For example, a user may specify multiple resolutions, where the image processor/controller 14 defines a sensor segment 114 for each specified resolution. In another embodiment, the user input may comprise a specified region of interest for the image, a desired frame rate, a power mode, etc., where the image processor/controller 14 defines the sensor segments responsive to this input. In yet another embodiment, the image processor/controller 14 may define the sensor segments 114 responsive to designated resolutions, each associated with a different operating mode, e.g., a different power mode. In another embodiment, the image processor/controller 14 may define the sensor segments 114 responsive to a brightness of different sections of an image. In still another embodiment, the image processor/controller 14 may apply a best fit model identifying which pixels 112 best satisfy one or more requirements (e.g., power configuration, frame rate, selected resolution, region of interest, etc.), and define a sensor segment 14 for the identified pixels 112.

While the above indicates that the image processor/controller 14 defines the sensor segments 114, it will be appreciated that the image sensor 100 may alternatively or additional define one or more sensor segments 114. In this case, image sensor 100 may base such sensor segment definition(s) on any of the same variable(s) relied upon by the image processor/controller 14, as discussed above.

FIG. 4 shows one exemplary sensor array 110 having two sensor segments 114. Sensor segment 114a comprises all pixels 112 in the sensor array 110, while sensor segment 114b comprises every other pixel 112 in the sensor array 110. The example of FIG. 4 demonstrates a simple implementation of the solution presented herein, which provides a full resolution sensor segment 114a and a reduced resolution, i.e., half resolution, sensor segment 114b. While sensor segment 114b skips every other pixel 112, it will be appreciated that the solution presented herein allows different skipping patterns to be used for different sensor segments 114. For example, a sensor segment 114 may comprise every $n^{th}$ pixel 112, where n may be any integer, e.g., 3, 5, 10, etc. In another example, the sensor segment 114 may comprise every $n^{th}$ subgroup of pixel circuits 112, where each subgroup of pixel circuits 112 includes a plurality of color-specific pixel circuits 112 arranged according to a color-filter pattern, e.g., a Bayer filter pattern. It will be appreciated that n may be configured to implement any pixel skipping pattern, e.g., dependent on a maximum resolution and aspect ratio of the sensor array 110. Such pixel skipping may be useful to reduce power consumption for situations where image resolution is less critical.

The sensor segments 114 may alternatively or additionally be defined for various regions of the sensor array 110. FIG. 5 shows another exemplary embodiment, where different sensor segments 114 comprise different clusters of pixels 112 spanning different regions of the sensor array 110. For example, the sensor segments 114 may include any one or more of:

a sensor segment 114a comprising all pixels 112;
a sensor segment 114b comprising pixels 112 in an upper left corner;
a sensor segment 114c comprising all pixels 112 in an upper middle section;
a sensor segment 114d comprising all pixels 112 in an upper right corner;
a sensor segment 114e comprising all pixels 112 in a left middle section;
a sensor segment 114f comprising all pixels 112 in a smaller central section;
a sensor segment 114g comprising all pixels 112 in a right middle section;
a sensor segment 114h comprising all pixels 112 in a larger central section;
a sensor segment 114i comprising all pixels 112 in a lower left corner;
a sensor segment 114j comprising all pixels 112 in a lower middle section;
a sensor segment 114k comprising all pixels 112 in a lower right corner.

Such cluster implementations may be useful when only a portion of an image (focused on a particular section of the image sensor 110) is important. For example, when only the image detected by the middle of the sensor array 110 is important, sensor segments 114a, 114f, and 114h may be defined for the sensor array 110. In another example, where only the image detected by corners of the sensor array 110 is important, sensor segments 114b, 114d, 114i, and 114k may be defined for the sensor array 110. In still another example, where only the image detected by center sections of the sensor array 110 is important, sensor segments 114c, 114f, 114j may be defined for the sensor array 110. It will be appreciated that the sensor segments 114a-k of FIG. 5 are for illustrative purposes, and thus are not limiting. Other sensor segments 114 not shown in FIG. 5 may also be used.

As noted above, the charge control circuit 120 selects one of the sensor segments 114. While the solution presented herein is described in terms of the selection of one sensor segment 114, multiple sensor segments 114 may be selected for pre-charging. For example, if the object of interest is in both segment 114d and 114f of FIG. 5, the solution presented herein may be used to pre-charge the pixels 112 in both sensor segments 114d, 114f. The charge control circuit 120 may select the sensor segment 114 responsive to an input control signal, e.g., as provided by the image processor/controller 14. Such an input control signal may specify any operating feature that defines, or helps define, which pixels and/or how many pixels to charge for a current operating mode or image capturing circumstance. For example, the charge control circuit 120 may select one of the sensor segments 114 responsive to a current power configuration (e.g., a power savings mode vs. a normal operating mode), a frame rate, a selected resolution (e.g., high resolution or low resolution), a region of interest, an image size, an image position of interest, etc. Alternatively, the input control signal from the image processor/controller 14 may directly specify a sensor segment 114 to be selected by the charge control circuit 120.

The charge control circuit 120 pre-charges the pixels 112 in the selected sensor segment 114. To that end, the charge control circuit 120 controls the RESET line for each pixel 112 in the selected sensor segment 114. Such control of the pixel RESET may be achieved any number of ways.

In one exemplary embodiment, each pixel 112 in the sensor array 110 connects to the charge control circuit 120 via a separate RESET control line. While this embodiment is the most complex, due to the independent RESET control line required for each pixel 112, it also allows the most flexibility in selectively controlling which pixels 112 are pre-charged, and thus is the most adaptive. One implementation for such a configuration would be to have the charge control circuit 120 activate only the RESET control lines of the pixels 112 in the selected sensor segment 114. In one exemplary embodiment, the charge control circuit 120 may include a switching network 122 that enables (e.g., closes) a switch for only the RESET control lines of the pixels 112 in the selected sensor segment 114. In another exemplary embodiment, the charge control circuit 120 may include a system of gates 124 with two or more inputs configured to selectively connect the charge control circuit 120 to the RESET control lines of the corresponding pixels 112 in the selected segment 114.

In another exemplary embodiment, a different common RESET control line may be used for each sensor segment 114. In this embodiment, the RESET control lines for each pixel 112 in a particular sensor segment 114 are tied to the common RESET control line for that sensor segment 114. For example, sensor segment 114a would have a RESETa control line, sensor segment 114b would have a RESETb control line, and sensor segment 114c would have a RESETc control line, as shown in FIG. 2. A common RESET control line for a sensor segment 114 comprising adjacent pixels 112, e.g., some number of adjacent pixels 112 in a row of pixels 112 and/or some number of adjacent pixels 112 in a column of pixels 112, may comprise the RESET control lines for those pixels 112 tied together. While the use of common RESET control lines reduces complexity, it also may provide less flexibility as may only allow the use of predefined sensor segments 114. One implementation for such a configuration would be to have the charge control circuit 120 activate only the common RESET control line of the selected sensor segment 114. In one exemplary embodiment, the charge control circuit 120 may include a switching network 122 that enables (e.g., closes) a switch for only the common RESET control line of the selected sensor segment 114. In another exemplary embodiment, the charge control circuit 120 may include a system of gates 124 with two or more inputs configured to selectively connect the charge control circuit 120 to the common RESET control line of the selected segment 114. For pixels 112 that are part of multiple sensor segments 114, it will be appreciated that such pixels 112 will be associated with multiple common RESET control lines.

The above generally describes the solution presented herein, along with various general embodiments. The following provides additional details for specific embodiments. It will be appreciated that the following is provided for illustrative purposes only, and thus, the solution presented herein is not limited to this specific example.

Figure 6:
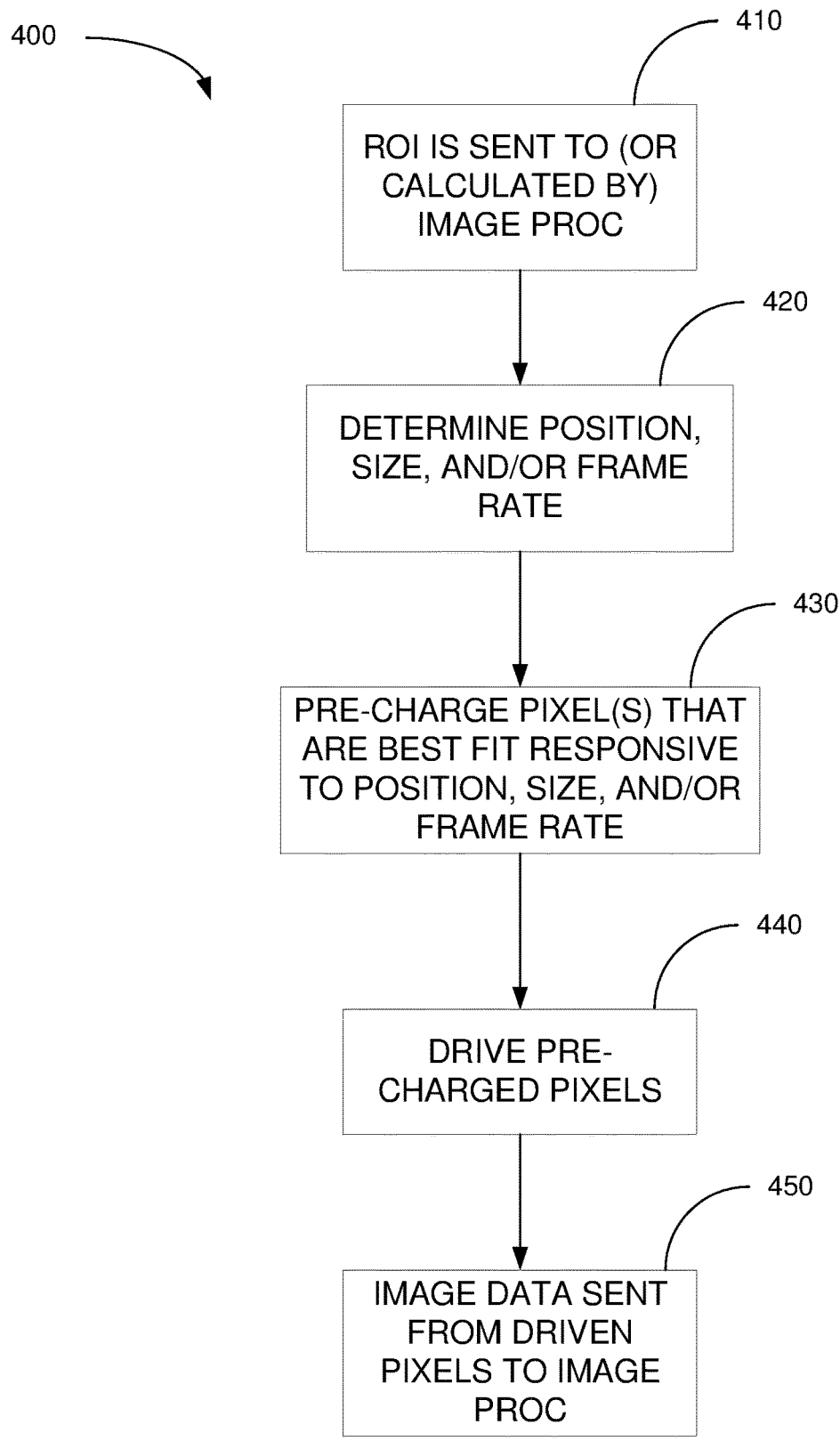
FIG. 6 shows another power reduction method according to exemplary embodiments of the solution presented herein.

FIG. 6 shows details for one exemplary method 400 according to the solution presented herein. The method 400 comprises the image processor/controller 14 receiving or determining a Region of Interest (ROI), and providing the ROI to the image sensor 100 (block 410). Responsive to the ROI, the method 400 further comprises the image sensor 100 determining a position, size, and/or frame rate for the image to be captured (block 420). The image sensor 100 pre-charges the pixels 112 that are a best fit for the determined position, size, and/or frame rate (block 430), e.g., by defining and/or selecting the sensor segment 114 that is the best fit for the determined position, size, and/or frame rate. The image sensor 100 drives the pre-charged pixels (block 440), and sends the detected light from the driven pixels to the image processor/controller 14 (block 450).

The solution presented herein improves power savings associated with an image capturing device 10 by only pre-charging those pixels 112 in the corresponding image sensor array 110 that are needed for a desired image and/or to achieve a desired goal, e.g., frame rate, resolution, power savings, etc. Further, by combining the solution presented herein with digital power savings techniques, the solution presented herein makes it possible to maximize the power reduction achievable for a particular image capturing device 10. In addition, when the solution presented herein is used to run the image capturing device 10 at lower resolutions and/or frame rate, the solution presented herein enables a sensor array capable of higher resolutions and/or frame rates to have a power consumption normally only achievable with a smaller and/or lower resolution sensor array. While pre-charging and driving fewer than all pixels 112 may impact the Field of View (FOV) of the sensor array 110, e.g., due to zoom and/or cropping functions limiting the useful area of the sensor array 110 to less than the full area of the sensor array 110, the impact of such a FOV loss in most scenarios is insignificant relative to the potential power savings.

Note that the apparatuses described herein may perform the methods herein, and any other processing, by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For example, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein. Thus, various apparatus elements disclosed herein, e.g., an image processor/controller, a charge control circuit, a drive control circuit, etc., may implement any functional means, modules, units, or circuitry, and may be embodied in hardware and/or in software (including firmware, resident software, microcode, etc.) executed on a controller or processor, including an application specific integrated circuit (ASIC).

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. An image sensor comprising:
    a plurality of pixel circuits, each pixel circuit being independently pre-chargeable and connected to a respective reset control line dedicated to the pixel circuit;
    a charge control circuit configured to select a set of the pixel circuits to pre-charge based on a frame rate specified by an input control signal; and
    a switching network configured to jointly pre-charge the set of pixel circuits by selectively directing a reset signal from the charge control circuit to the pixel circuits in the set via the respective reset control lines to which they are connected.

2. The image sensor of claim 1, wherein the charge control circuit is configured to select the set of pixel circuits to pre-charge further based on a power configuration specified by the input control signal.

3. The image sensor of claim 1, wherein the charge control circuit is configured to select the set of pixel circuits to pre-charge responsive to the input control signal specifying the selected pixel circuits.

4. The image sensor of claim 1, wherein to select the set of pixel circuits to pre-charge the charge control circuit is configured to select alternating ones of the plurality of pixel circuits.

5. The image sensor of claim 1, wherein to select the set of pixel circuits the charge control circuit is configured to select every $n^{th}$ one of the pixel circuits.

6. The image sensor of claim 5 wherein n equals 3 or 5 or 10.

7. The image sensor of claim 1, further comprising a drive control circuit configured to drive at least one of the pixel circuits in the set to output sensed light data to an image processor.

8. The image sensor of claim 1, wherein:
    to select the set of pixel circuits to pre-charge, the charge control circuit is configured to select every $n^{th}$ pixel circuit in a subgroup of the pixel circuits;
    the subgroup is one of a plurality of subgroups of the pixel circuits; and
    each of the subgroups comprises color-specific ones of the pixel circuits arranged according to a color-filter pattern.

9. The image sensor of claim 1, wherein the charge control circuit is configured to select the set of pixel circuits to pre-charge further based on a resolution specified by the input control signal.

10. The image sensor of claim 1, wherein the charge control circuit is configured to select the set of pixel circuits to pre-charge further based on a region specified by the input control signal.

11. A method, implemented by an image sensor comprising a plurality of pixel circuits, the method comprising:
    selecting a set of pixel circuits to pre-charge from the plurality of pixel circuits based on a frame rate specified by an input control signal, wherein each of the pixel circuits in the plurality of pixel circuits is independently pre-chargeable and is connected to a respective reset control line dedicated to the pixel circuit;
    jointly pre-charging the selected set of pixel circuits by selectively directing a reset signal to the selected set of pixel circuits via the respective reset control lines to which they are connected.

12. The method of claim 11, wherein selecting the set of pixel circuits to pre-charge is further based on a power configuration specified by the input control signal.

13. The method of claim 11, wherein selecting the set of pixel circuits to pre-charge is responsive to the input control signal specifying the selected pixel circuits.

14. The method of claim 11, wherein selecting the set of pixel circuits to pre-charge comprises selecting alternating ones of the plurality of pixel circuits.

15. The method of claim 11, wherein selecting the set of pixel circuits to pre-charge comprises selecting every $n^{th}$ one of the pixel circuits.

16. The method of claim 11, further comprising driving at least one of the pixel circuits in the set to output sensed light data to an image processor.

17. The method of claim 11, wherein:
    selecting the set of pixel circuits to pre-charge comprises selecting every nth pixel circuit in a subgroup of the pixel circuits;
    the subgroup is one of a plurality of subgroups of the pixel circuits; and
    each of the subgroups comprises color-specific ones of the pixel circuits arranged according to a color-filter pattern.

18. The method of claim 11, wherein selecting the set of pixel circuits to pre-charge is further based on a resolution specified by the input control signal.

19. The method of claim 11, wherein selecting the set of pixel circuits to pre-charge is further based on a region specified by the input control signal.

* * * * *